United States Patent [19]

Kielma

[11] Patent Number: 4,536,111
[45] Date of Patent: Aug. 20, 1985

[54] MACHINE TOOL HAVING NUMERICALLY CONTROLLED ADJUSTABLE ARBOR SET UP FOR STRADDLE MILLING

[75] Inventor: Ervin J. Kielma, West Allis, Wis.

[73] Assignee: Kearney & Trecker Corporation, West Allis, Wis.

[21] Appl. No.: 385,906

[22] Filed: Jun. 7, 1982

[51] Int. Cl.³ .......................... B23C 1/02; B23C 7/00
[52] U.S. Cl. ........................................ 409/80; 83/504; 409/144; 409/213; 409/217; 409/234
[58] Field of Search ................. 409/80, 144, 213, 236, 409/232, 233, 234, 231, 217, 206, 207; 83/499, 504, 665

[56] References Cited

U.S. PATENT DOCUMENTS

| | | | |
|---|---|---|---|
| 1,658,267 | 2/1928 | Trecker | 409/213 |
| 2,699,338 | 1/1955 | Rue et al. | 83/665 X |
| 3,600,777 | 8/1971 | Ollearo et al. | 29/26 A |
| 3,630,244 | 12/1971 | Cromeens | 83/665 X |
| 3,750,513 | 8/1973 | Cromeens | 83/499 X |
| 3,786,702 | 1/1974 | Saari | 83/5 |
| 3,899,955 | 8/1975 | Selch | 409/236 X |
| 4,266,893 | 5/1981 | Tröger et al. | 409/236 X |

FOREIGN PATENT DOCUMENTS 0032890  7/1981  European Pat. Off. ............ 29/568
2436810  2/1976  Fed. Rep. of Germany.

Primary Examiner—Z. R. Bilinsky
Attorney, Agent, or Firm—Quarles & Brady

[57]  ABSTRACT

A machine tool having a numerically controlled adjustable arbor for facilitating different straddle milling operations on random workpieces without the need for manual adjustment of the cutter width comprises a frame which carries a power station thereon. The power station has a rotary driven spindle which is journaled within a quill which is movable out from and into the power station under numerical control. A bifurcated arbor, configured of a pair of coaxial shafts which are in sleeved engagement with each other so as to be axially movable to and from each other while rotating co-jointly with each other, is coupled at one end to the power station spindle and is journaled at its distal end in a fixed arbor support. Each shaft of the bifurcated arbor carries a straddle milling cutter thereon in spaced apart relationship with the cutter on the other arbor member. By controlling the axial movement of the power station quill, the separation between straddle milling cutters can be controlled accordingly without the need for operator intervention.

3 Claims, 2 Drawing Figures

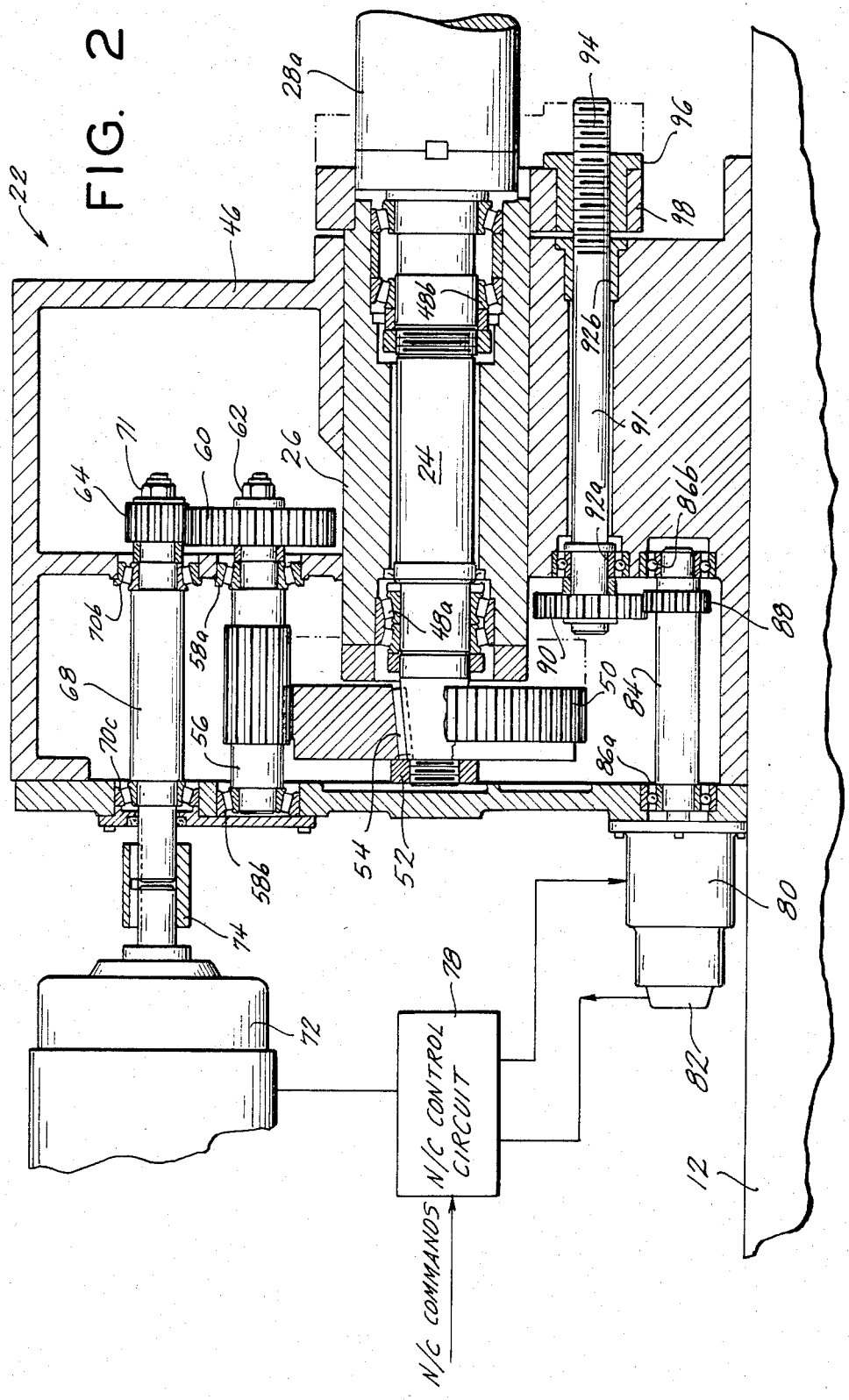

MACHINE TOOL HAVING NUMERICALLY CONTROLLED ADJUSTABLE ARBOR SET UP FOR STRADDLE MILLING

BACKGROUND OF THE INVENTION

This invention relates generally to milling machine tools and more specifically, this invention relates to a milling machine having a numerically controlled adjustable arbor to enable automatic adjustment of the width between arbor milling cutters carried on the arbor thereby facilitating random workpiece machining.

One of the most common metal working operations employed in the production of machined parts is that of milling whereby a rotary driven cutting tool is brought into contact with the surface of a workpiece to shave metal therefrom. Milling machines which are generally employed to carry out milling operations have a rotary driven spindle for rotatably driving the milling cutter and a movable table for supporting the workpiece and for moving the workpiece into operative engagement with the milling cutter. Small and moderate size milling cutters are usually carried on a toolholder which is inserted directly into the milling machine spindle so as to be rotatably driven thereby. When larger milling cutters are to be employed, securing the milling cutter to a toolholder for insertion into the spindle becomes impractical. Instead, the large milling cutter is coaxially carried on an arbor which is secured at one end to the machine tool spindle and is rotatably supported at its other end on the machine tool by one or more arbor supports in coaxial alignment with the spindle. Usually, with conventional milling machine arbor set ups such as described above, the arbor can carry more than one large milling cutter at a time. Often, it is desirable to employ two or more large milling cutters in spaced apart relationship for performing straddle milling operations in which the workpiece is milled by the two spaced-apart milling cutters which thus straddle portions of the workpiece, giving rise to the term "straddle milling".

In the past, operator intervention has been required to adjust the distance between milling cutters on the arbor to facilitate different straddle milling operations on random workpieces. Typically, in order to adjust the cutter spacing, the machine has to be stopped and the operator has to remove an arbor support and change the spacers on the arbor between the cutters on the arbor so as to alter the spacing between the cutters. Once the milling cutters on the arbor have been respaced on the arbor, the arbor support is reassembled and the arbor support is re-engaged with the arbor before the machine is restarted. All during the time that this occurs, machine part production has been interrupted, causing an increase in machine idle time.

In an effort to eliminate the need to manually adjust the width between milling cutters on the arbor of the milling machine to enable different straddle milling operations on random workpieces, the present invention discloses a machine tool having a numerically controlled adjustable arbor set up which allows for automatic control of the width of arbor milling cutters responsive to N/C commands, thereby eliminating the need for operator intervention when machining random workpieces.

It is therefore an object of the present invention to provide a machine tool having a numerically controlled adjustable arbor set which allows automatic adjustment of the width between arbor milling cutters responsive to numerical control commands.

It is yet another object of the present invention to provide a milling machine having a numerically controlled, adjustable arbor which allows automatic adjustment of the arbor milling cutters responsive to numerical control commands while the arbor is rotatably driven by the spindle.

Other objects of the invention will become apparent from the description of the invention provided hereinafter.

BRIEF SUMMARY OF THE INVENTION

Briefly, in accordance with the preferred embodiment of the invention, a machine tool is provided having a numerically controlled adjustable arbor set up for varying the spacing between arbor milling cutters. The numerically controlled adjustable arbor for varying arbor cutter spacing responsive to numerical control commands for facilitating random workpiece machining comprises a frame which carries at least one and preferably two arbor supports in axial alignment with each other. A power station is carried on the frame and has a rotatably driven spindle which is carried in a quill journaled in the power station for reciprocal movement out from and into the power station along the axis of the arbor supports. The power station is provided with a pair of servo controlled motors for driving the spindle and for axially reciprocating the quill, respectively responsive to numerical control commands. An arbor is coupled to the spindle and extends through the first arbor support so that its opposite end is journaled into the second arbor support for co-joint rotation with the spindle. The arbor is advantageously comprised of a pair of cylindrical members in sleeved engagement with each other so as to be axially movable to and from each other while rotating co-jointly with each other. Each of the arbor members is adapted to carry an arbor milling cutter thereon in parallel spaced apart coaxial alignment with the milling cutter on the other of arbor members. By reciprocating the spindle and the quill out from and into the housing in response to numerical control commands, the arbor members are moved to and from each other so as to vary the distance between arbor milling cutters without the need for operator intervention.

BRIEF DESCRIPTIONS OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 1 is a side view of a machine tool constructed in accordance with the teachings of the present invention; and FIG. 2 is a cut away longitudinal view of the milling head of the machine tool of FIG. 1.

DETAILED DESCRIPTION OF THE PREFERRED EMBODIMENT

Figure 1:
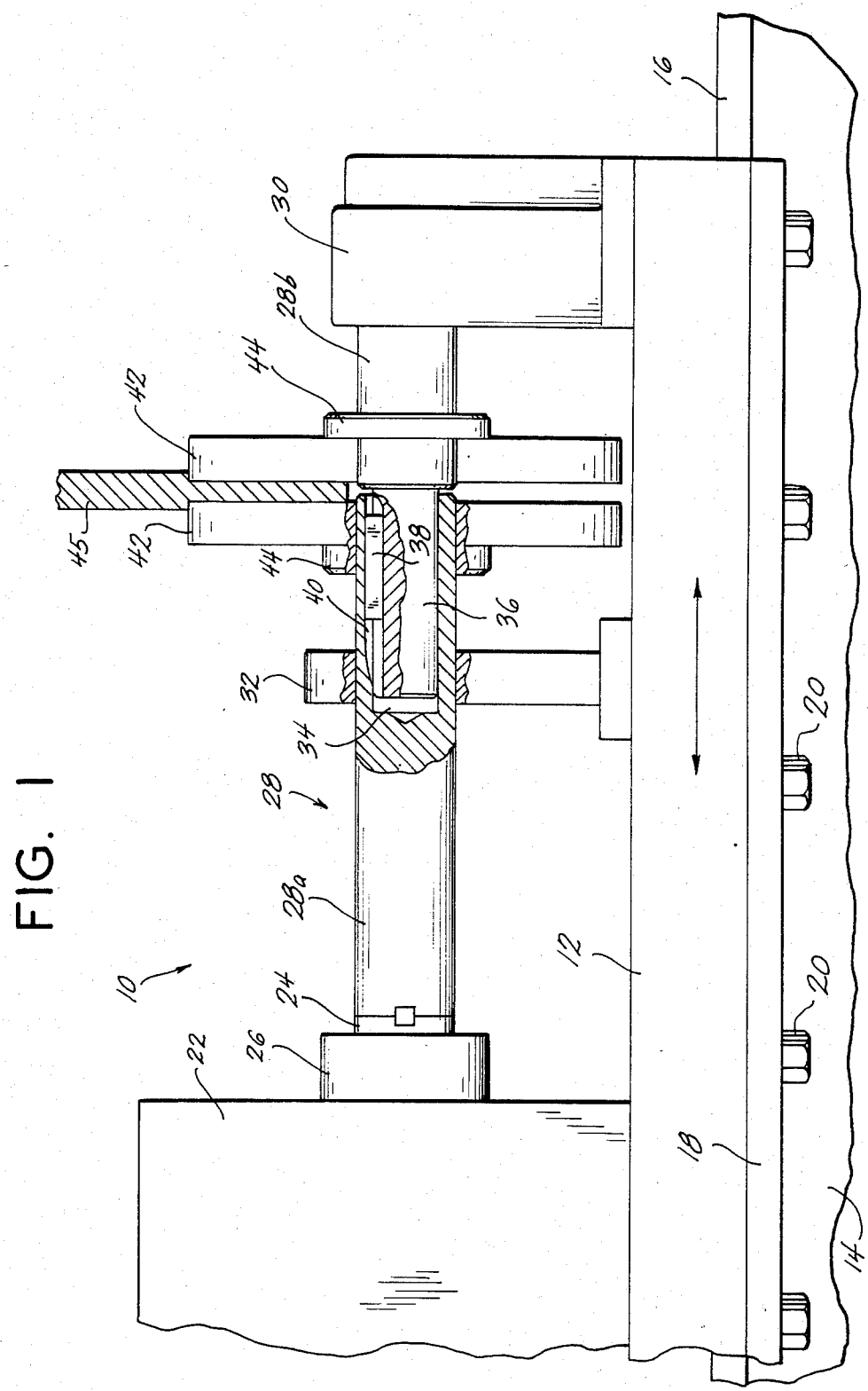

Referring now to the figures and especially FIG. 1, a machine tool 10 having a numerically controlled adjustable arbor set up to facilitate random workpiece machining comprises a frame 12 which, in the presently preferred embodiment, is slidably mounted on a platform 14 for movement on the platform along a set of platform ways 16. The frame is slidably secured to the platform by roller gibs 18 which are attached to frame 12 by bolts 20. Means (not shown) typically taking the form of a servo-driven ball screw and a ball nut are provided for precisely displacing frame 12 along platform 14 in response to numerical control commands.

Frame 12 carries a power station 22 thereon, the power station being affixed to the frame at one end thereof. The details of power station 22 will be described hereinafter with respect to FIG. 2 but for purposes of the present discussion it will be sufficient to understand that power station 22 has a rotary driven spindle 24 carried in a quill 26 which is axially reciprocal out from and into the power station along the axis of spindle rotation in response to numerical control commands. An arbor 28 for carrying large milling cutters thereon, is secured at one end thereof to spindle 24 and is journaled at its opposite end into a fixed arbor support 30 which is carried on frame 12 opposite to power station 22 so to be in axial alignment with spindle 24. In practice, arbor 28 is also journaled through an intermediate arbor support 32 which is affixed to frame 12 medially between outer arbor support 30 and power station 22.

Unlike conventional milling machine arbors which are configured of a single cylindrical member having one or more arbor milling cutters coaxially secured thereon in parallel spaced apart relationship, arbor 28 is advantageously bifurcated and comprises a pair of arbor members 28a and 28b which are in sleeved engagement with each other so as to be axially movable to and from each while undergoing co-joint rotation. To this end, arbor member 28a, which is secured at one end thereof to spindle 24, has a bore 34 in the end thereof distal from spindle 24, which bore is dimensioned to receive the reduced diameter end 36 of arbor member 28b whose opposite end is journaled in arbor support 30. The reduced diameter end 36 of arbor member 28b has a radially embedded, axially extending key 38 which is in engagement with a complementary keyway 40 inscribed in bore 34 in the end of arbor member 28a. While member 28a is disposed to move axially with respect to power station 22, member 22b is fixed against axial movement in relation to the power station. The sliding engagement of key 38 of arbor member 28b within keyway 40 of arbor member 28a enables arbor member 28a to be reciprocated relative to arbor member 28b when quill 26 is reciprocated out from and into power station 22 in response to numerical control commands while both the arbor members are rotatably driven by spindle 24.

Each of arbor members 28a and 28b is dimensioned to carry at least one conventional arbor milling cutter 42, the arbor milling cutter on each arbor member bearing against a flange 44 integrated to the arbor member adjacent to the end of the arbor member. As can now be appreciated, the sleeved engagement of arbor member 28a with arbor member 28b facilitates axial movement of arbor milling cutter 42 on arbor member 28a to and from arbor milling cutter 42 on arbor 28b as the milling cutters are rotated simultaneously by the arbor members. By reciprocating quill 26 responsive to numerical control commands, the spacing between cutters 42 can be varied automatically in contrast to the fixed arbor milling cutter spacing of prior art of arbor arrangements. Thus for example, when quill 26 and hence spindle 24 are fully outwardly reciprocated from power station 22, arbor milling cutter 42 on arbor member 28a is positioned at a predetermined minimum distance from arbor milling cutter 42 on arbor member 28b as is illustrated in solid lines in FIG. 1. When quill 26 and spindle 24 are retracted into the power station, arbor milling cutter 42 on arbor member 28a is axially displaced apart from cutter 42 on arbor member 28b.

With the advent of the present invention, straddle milling operations on random workpieces, such as workpiece 45, which are carried by a workpiece supporting table or the like (not shown) that is movable to and from cutters 42 on arbor members 28a and 28b, can be accomplished automatically without any need for operator intervention as required by fixed arbor arrangements of the prior art.

To better understand the details of power station 22 and in particular the details of how quill 26 is reciprocated out from and is retracted into power station 22 responsive to numerical control commands, reference should be had to FIG. 2 which is a cut away longitudinal view of power station 22. As illustrated, power station 22 is comprised of a housing 46 which is secured to frame 12 by fasteners (not shown). Housing 46 has an opening in the forward (rightward) end thereof for receiving quill 26 within which spindle 24 is journaled by bearings 48a and 48b, each bearing being carried on the spindle at separate one of the spindle ends. The rearward (leftward) end of spindle 24 is tapered and extends beyond quill 26 for carrying a gear 50 which has a complementary tapered bore therethrough. A nut 52 is threaded about the end of the spindle to bear against gear 50 to secure the gear on the spindle. A key 54 is axially embedded in the rearward spindle end to engage a complementary keyway (not shown) in the bore of gear 50 to maintain driving engagement between the spindle and the gear.

The teeth on gear 50 meshingly engage the teeth on a complimentary-dimensioned drive pinion 56 which is journaled into housing 46 by bearings 58a and 58b so as to be parallel to spindle 24 and quill 26. The forward end of drive pinion 56 carries a spur gear 60 which is urged against a shoulder on the drive pinion by a nut 62 which is threaded about the forward end of the drive pinion. Spur gear 60 is dimensioned for meshing engagement with a spur gear 64 which is carried on the forward end of a drive shaft 68 that is journaled in housing 46 by bearings 70c and 70b so as to be parallel to quill 26 and drive pinion 56. A nut 71 is threaded onto the forward end of shaft 68 to urge gear 64 against a shoulder on the shaft to keep the gear secured to the shaft.

Drive shaft 68 extends rearwardly through an opening in the rearward end of housing 46 for coupling the shaft of a spindle drive motor 72 via a universal coupling 74. Spindle drive motor 72, which is supported from frame 12 by brackets (not shown), so as to be adjacent to housing 46, is energized from a numerical control (N/C) circuit 78 such as are well known in the art, in response to N/C commands, which are supplied to the N/C control circuit from a tape reader or the like (not shown).

N/C control circuit 78, in addition to controlling the excitation of spindle drive motor 72 in accordance with N/C commands to precisely control spindle rotation, also controls the excitation of a motor 80, which as will be seen hereinafter, is operative to reciprocate the quill 26 out from and into housing 46 in accordance with the difference between the desired quill position, as represented by N/C commands entered to N/C control circuit 78, and the actual quill position as represented by the output signal of a feedback transducer 82 which is attached to motor 80 for supplying the N/C control circuit with an electrical signal indicative of the motor shaft position.

To reciprocate quill 26, motor 80 secured to the rearward end of housing 46 so that its shaft 84 extends through an opening in the rearward housing end. A pair of bearings 86a and 86b are carried on the rearward and forward motor shaft ends, respectively and journal the shaft to the housing so that the shaft is parallel to the axis of quill 26 and spindle 24. A gear 88 is carried on the forward end of motor shaft 84 and is dimensioned for meshing engagement with a gear 90 carried on the rearward end of a shaft 91 which is journaled in housing 46 by bearings 92a and 92b so as to be parallel to spindle 24, quill 26 and shaft 84. The forward end 94 of shaft 91 is threaded for meshingly engaging complementary threads on the bore of a nut 96 which is pressed into the bore of the radially extending portion of a flange-like member 98 which circumscribes the forward end of the quill. The co-action of the threads on shaft 91 with the threads of nut 96 causes nut 96, flange 98 and hence quill 26 and spindle 24 to be urged rearwardly into housing 46 as shaft 91 is threaded into nut 96. Conversely, as shaft 91 is threaded out from nut 96, the nut the flange and hence the quill and the spindle are urged forwardly from housing 46. Thus, by controlling the rotation of shaft 91, the axial reciprocation of quill 26 out from and into housing 46 can be varied accordingly.

Recalling that arbor member 28a is secured to spindle 24 for co-joint rotation therewith, reciprocating quill 26 out from and into housing 46 by threading shaft 91 into and out of collar 96, respectively thus serves to reciprocate arbor member 28a out from and into arbor member 28b (FIG. 1) which causes the spacing between arbor milling cutter 42 (FIG. 1) on arbor member 28a and arbor milling cutter 42 (FIG. 1) on arbor member 28b (FIG. 1) to be increased and decreased accordingly. The rotation of motor shaft 84 and shaft 91, which as just indicated causes the reciprocation of quill 26 and hence the displacement of arbor milling cutters 42, on arbor 28a from arbor milling cutter 42 on arbor member 28, is controlled by N/C control circuit 78 in accordance with the difference between the desired motor shaft position, as determined by the N/C commands received by N/C control system 78, and the actual motor shaft position as represented by the output signal of feedback transducer 82, which output signal corresponds to the actual quill position. In this way the spacing between arbor milling cutters can be controlled automatically by simply entering the appropriate N/C command to the N/C control circuit. Typically such N/C commands would be stored on tape and supplied to N/C control circuit 78 automatically during machine tool operation.

The foregoing discloses a machine tool having a numerically controlled adjustable arbor set up for automatically varying the separation between arbor milling cutters so as to enable random workpiece machining without operator intervention.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

What is claimed is:

1. In a machine tool having a rotary spindle movable axially and numerically controlled, cutting apparatus comprising:
   a frame;
   an arbor support carried on said frame;
   a first arbor member coupled to the spindle for rotation therewith and movable axially therewith;
   a second arbor member in axial alignment with said first arbor member rotatably supported by said arbor support and fixed against axial movement;
   a reduced diameter end on one of said arbor members for reception in an axial bore formed in the other of said arbor members so that said first arbor is movable axially relative to said second arbor while maintaining said arbors in precise axial alignment,
   means on said reduced diameter end for coupling said second arbor member to said first arbor member for rotating said first and second arbor members in unison;
   a first cutter fixedly mounted on said first arbor member for rotation therewith and movable axially therewith; and
   a second cutter mounted on said second arbor member for rotation therewith in axial alignment and spaced apart relationship with said first cutter so that said first and second cutters can operate simultaneously on a single workpiece.

2. The apparatus of claim 1 wherein:
   said means coupling said second arbor member to said first arbor member comprises a key engaged in a keyway for transmitting rotary power from said first arbor member to said second member.

3. The apparatus of claim 2; including a drive responsive to a numerical control command and coupled to move said spindle axially for selectively varying the spacing between said cutters.

* * * * *